United States Patent [19]
Carrea et al.

[11] Patent Number: 5,833,738
[45] Date of Patent: Nov. 10, 1998

[54] SPECIALTY GAS PURIFICATION SYSTEM

[75] Inventors: Giovanni Carrea; Brian D. Warrick; Lewis J. Wickman, all of Colorado Springs, Colo.

[73] Assignee: D.D.I. Ltd., British West Indies

[21] Appl. No.: 609,240

[22] Filed: Mar. 1, 1996

[51] Int. Cl.$^6$ .......................... B01D 53/04; B01D 53/26
[52] U.S. Cl. .................. 95/115; 95/122; 95/138; 95/139; 95/140; 96/130; 96/144
[58] Field of Search .................. 95/177.121–126, 95/138–140, 115, 116; 96/108, 130, 133, 144

[56] References Cited

U.S. PATENT DOCUMENTS

| | | | |
|---|---|---|---|
| 3,150,942 | 9/1964 | Vasan | 55/31 |
| 3,237,377 | 3/1966 | Skarstrom | 95/121 X |
| 3,568,406 | 3/1971 | Dynes | 95/122 X |
| 4,312,669 | 1/1982 | Boffito et al. | 95/117 X |
| 4,579,723 | 4/1986 | Weltmer et al. | 423/219 |
| 4,663,052 | 5/1987 | Sherman et al. | 95/117 X |
| 4,711,645 | 12/1987 | Kumar | 95/122 X |
| 4,717,551 | 1/1988 | Bernauer et al. | 95/117 X |
| 5,110,569 | 5/1992 | Jain | 423/230 |
| 5,137,549 | 8/1992 | Stanford et al. | 95/117 X |
| 5,147,419 | 9/1992 | Schoofs et al. | 95/126 X |
| 5,198,001 | 3/1993 | Knebel et al. | 55/28 |
| 5,202,096 | 4/1993 | Jain | 422/190 |
| 5,232,474 | 8/1993 | Jain | 95/122 X |
| 5,240,472 | 8/1993 | Sircar | 95/120 X |
| 5,271,762 | 12/1993 | Schoofs et al. | 95/126 X |
| 5,359,787 | 11/1994 | Mostowy, Jr. et al. | 34/343 |
| 5,425,242 | 6/1995 | Dunne et al. | 95/119 X |
| 5,489,327 | 2/1996 | Otsuka et al. | 95/140 X |
| 5,514,204 | 5/1996 | Sheu et al. | 95/121 X |
| 5,556,603 | 9/1996 | Succi et al. | 95/140 X |

*Primary Examiner*—Robert Spitzer
*Attorney, Agent, or Firm*—David H. Jaffer

[57] ABSTRACT

A method and apparatus are disclosed showing a system for continuous purification of bulk source specialty gases to less than 10 part per billion levels. Corrosive and non-corrosive specialty gases are purified using this system. Depending on whether corrosive or non-corrosive gases are being purified and the contaminants of concern, the purification beds contain an absorber and/or getter. A dual bed system allows one bed to purify at ambient temperatures while a second bed undergoes regeneration, providing continuous purification for a bulk source specialty gas.

8 Claims, 1 Drawing Sheet

SPECIALTY GAS PURIFICATION SYSTEM

BACKGROUND OF THE INVENTION

1. Field of the Invention

The invention relates generally to a method and apparatus for purification of bulk source (such as liquid, trailer, or large cylinder source) non-corrosive specialty gases (such as $AsH_3$, $B_2H_6$, $CF_4$, $C_2F_6$, $CCl_4$, $CH_4$, $SiH_2Cl_2$, $GeH_4$, $Ge_2H_6$, $H_2Se$, $NH_3$, $N_2O$, $PH_3$, $SF_6$, $SiH_4$, $Si_2H_6$, $CO$, $CO_2$, $CH_2F_2$, $CHF_3$, $CH_3F$, and other freons) and corrosive specialty gases (such as $BCl_3$, $BF_3$, $Cl_2$, $F_2$, $HBr$, $HCl$, $HF$, $NF_3$, $SiF_4$, and $WF_6$). In particular, the invention relates to a method and apparatus for continuous removal of impurities from bulk source specialty gases using two alternating purifier beds. The purifier beds contain a getter and/or an absorber and are operated at ambient temperatures (0° C. to 50° C.). The purifier beds are alternately regenerated allowing continuous operation of the purification system.

2. Brief Description of the Prior Art

In the electronics industry, high purity specialty gases are required for many operations and are generally obtained in either high purity cylinder form or from bulk gas sources which are purified at the point of use. High purity cylinder sources provide the levels of purity required but are not convenient or cost effective where large volumes of gas are needed on a continuous basis. Bulk source specialty gases stored in trailer, liquid, or large cylinder form provide large volumes of gas but generally do not meet the required high purity standards.

A purification system capable of purifying large volumes of a specialty gas from a bulk source on a continuous basis would offer significant advantages: increased efficiency in gas storage and transportation, reduced capital investment in the gas delivery system due to the need for fewer point of use purifiers, reduced personnel time required for regular gas cylinder changes, greater gas consistency, and reduced gas costs due to volume purchasing discounts. Bulk source systems have been proposed for delivery of corrosive gases. However, the proposed systems are not continuous.

For example, Mostowy, Jr. et al. (U.S. Pat. No. 5,359,787) describe a method and apparatus for delivering corrosive chemicals from a bulk source to a point of use while reducing water content to below 100 parts per billion. Corrosive gases (HCl, HBr, HF, HI, or mixtures of these gases) flow through a delivery conduit from a bulk source to a point of use. The delivery conduit heats and dehydrates the gas with a metal halide, reducing the pressure of the gas before delivery to the point of use. The system uses a metal halide dehydrator which requires periodic replacement when reaching its water capacity. Replacement of the metal halide requires shut down of the system, thereby providing a system which is non-continuous.

Continuous purification systems have been described which remove CO, $CO_2$, $H_2$, and $H_2O$ with a catalyst and an absorber, from air and nitrogen (see U.S. Pat. No. 5,110,569).

Although each of the described systems provides a partial solution to the problem, none of the systems describe a continuous purification system for removal of impurities from bulk source specialty gases.

SUMMARY OF THE INVENTION

It is therefore an object of the present invention to provide a method and apparatus for removal of impurities from bulk source non-corrosive specialty gases (such as $AsH_3$, $B_2H_6$, $CF_4$, $C_2F_6$, $CCl_4$, $CH_4$, $SiH_2Cl_2$, $GeH_4$, $Ge_2H_6$, $H_2Se$, $NH_3$, $N_2O$, $PH_3$, $SF_6$, $SiH_4$, $Si_2H_6$, $CO$, $CO_2$, $CH_2F_2$, $CHF_3$, $CH_3F$, and other freons) and specialty gases (such as $BCl_3$, $BF_3$, $Cl_2$, $F_2$, $HBr$, $HCl$, $HF$, $NF_3$, $SiF_4$, and $WF_6$). Non-corrosive specialty gases and corrosive specialty gases are collectively referred to below as "specialty gases."

It is a further object of the present invention to provide a method and apparatus for removal of impurities from bulk source specialty gases to levels below 10 ppb.

It is another object of the present invention to provide a method and apparatus for removal of impurities from bulk source specialty gases to levels below 1 ppb.

It is yet another object of the present invention to provide a method and apparatus for removal of impurities from bulk source specialty gases using two alternating purifier beds.

It is still another object of the present invention to provide a method and apparatus for continuous purification of bulk source specialty gases.

Briefly, the preferred embodiment of the present invention utilizes two alternating purifier beds to purify a specialty gas from a bulk source. One bed purifies at ambient temperatures (0° C. to 50° C.) while the other bed undergoes regeneration. By utilizing two alternating beds, bulk source specialty gases are continuously purified. The two beds each contain a getter and/or an absorber and allow purification of bulk source specialty gases to purity levels of less than 10 ppb, and preferably to less than 1 ppb.

IN THE DRAWINGS

FIG. 1 is a plan view of a dual bed specialty gas purification system in accordance with the present invention.

DETAILED DESCRIPTION OF THE PREFERRED EMBODIMENT

Figure 1:
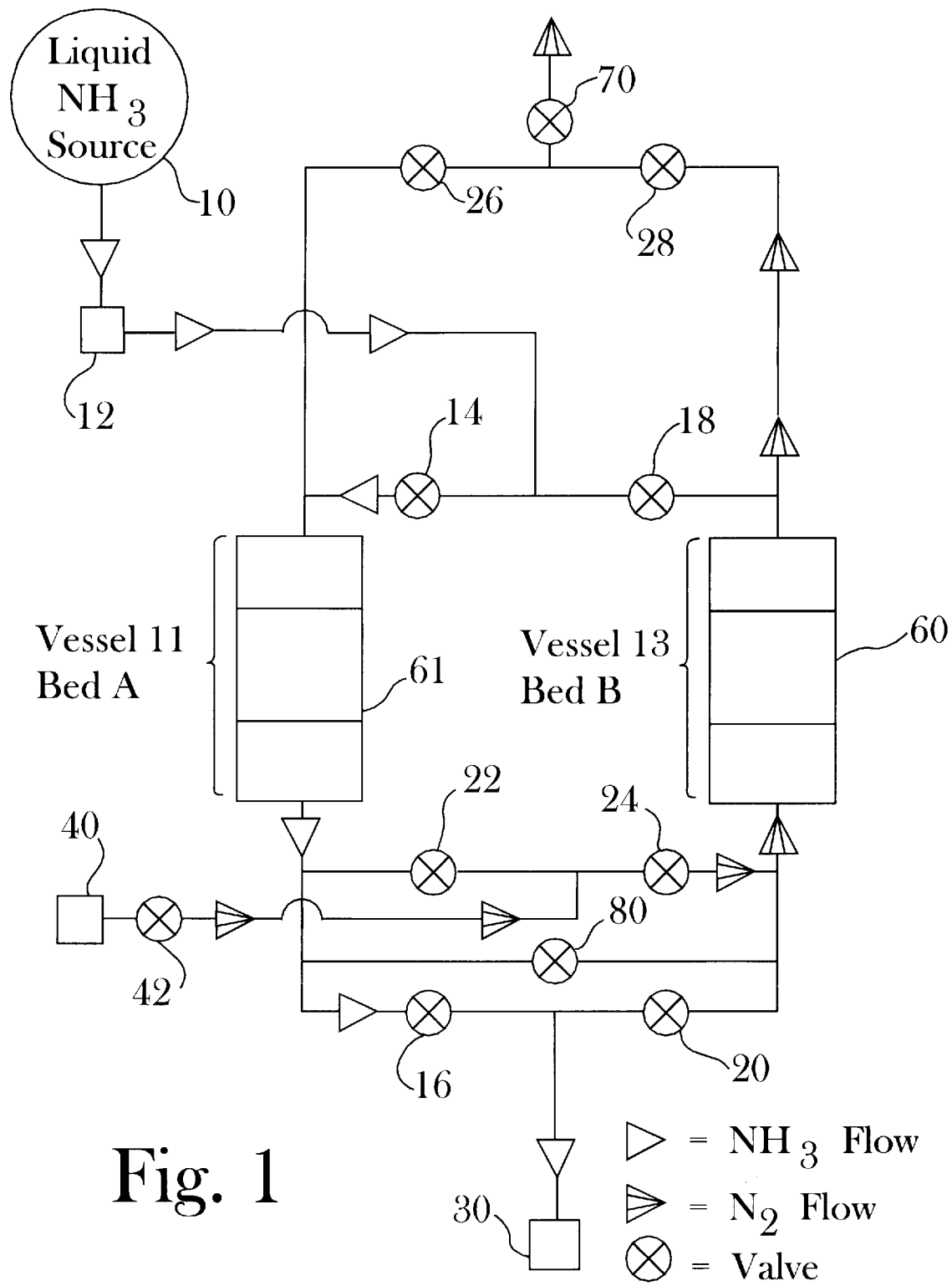

As described above, this invention provides a method and apparatus for continuous removal of impurities from bulk source specialty gases. Non-corrosive specialty gases are purified using a getter and/or an absorber and corrosive gases are purified with an absorber alone.

The absorber, which reduces water and/or carbon dioxide levels from initial concentrations greater than 1 ppm to levels of less than 10 ppb, may be used for both corrosive and non-corrosive specialty gases. Non-corrosive gases containing levels of water and/or carbon dioxide exceeding 1 ppm may be purified with an absorber combined with a getter. In the preferred embodiment, an absorber is placed before the getter, thereby reducing water and carbon dioxide levels before the gas reaches the getter. The absorber bed for non-corrosive gases is typically a high surface area molecular sieve. However, silica gel or alumina may also be used. Molecular sieve absorbers can remove both carbon dioxide and water, while silica gel or alumina absorbers remove only water. In a preferred embodiment, a 13X molecular sieve (manufactured by UOP and composed of alumina silicates with a pore size of 13 Å) is used to remove carbon dioxide and water.

The absorber for corrosive specialty gases is typically a corrosion resistant absorber such as a corrosion resistant molecular sieve, or an activated alumina. Typical corrosive resistant molecular sieves include type AW-300 or AW-500 sold by Linde (AW-300 available as CaO $K_2O$ $Na_2O$ $Al_2O_3$ $SiO_2$ in 1/16 inch pellets with a 4 Å pore size and type AW-500 available as $Fe_2O$ MgO $Na_2O$ $K_2O$ CaO $Al_2O_3$ $SiO_2$ in 1/16 inch pellets with a 5 Å pore size). Any corrosive resistant absorber may be used. However, there may be specific advantages and disadvantages to using one type or another. For example, activated alumina is typically more resistant to corrosion than molecular sieves. Getters are not used for purification of corrosive gases due to the potential for the gas to react with the getter materials and form volatile compounds (such as metal halides) which may contaminate the gas distribution system.

Water present in corrosive gases causes corrosion of the gas system and results in increased particulate contamination. Purification with an absorber reduces water levels above 1 ppm to less than 10 ppb while reducing carbon dioxide (dependent on type of absorber) to the same levels.

Purification of non-corrosive specialty gases can be performed using an absorber alone, a getter alone, or a combination of a getter and an absorber. In this case, the absorber removes excess $CO_2$ and/or $H_2O$ and may be used alone where $CO_2$ and/or $H_2O$ are the only impurities which need to be reduced. The absorber may also be combined with a getter to remove CO and $O_2$ in addition to $CO_2$ and $H_2O$.

A variety of getters may be used for purifying non-corrosive specialty gases. A zirconium/iron/tin getter alloy, with weight percents of approximately 79% zirconium, 20% iron, and 1% tin is preferred. Table 1 illustrates getters which may be used for purification of non-corrosive gases. In addition to zirconium/iron/tin getters, other zirconium/iron getter alloys (such as alloys 3–8 in Table 1) are preferred. Other zirconium and titanium alloys (such as alloys 1, 2, 9, and 10) may also be used as may other suitable getters.

TABLE 1

| Alloy ID | Weight Percent | | | | | |
|---|---|---|---|---|---|---|
| | Al | Ti | V | Fe | Zr | Ni |
| 1 | 13.8 | — | — | — | 86.2 | — |
| 2 | 13.7 | — | — | — | 86.3 | — |
| 3 | — | — | — | 26.4 | 73.6 | — |
| 4 | — | — | 1.8 | 29.0 | 69.2 | — |
| 5 | 1.9 | — | 28.1 | 4.4 | 65.6 | — |
| 6 | — | 6.8 | 26.3 | 9.9 | 57.0 | — |
| 7 | 1.7 | 18.1 | 19.5 | 19.0 | 41.7 | — |
| 8 | 1.5 | 13.1 | 21.2 | 15.3 | 48.9 | — |
| 9 | 1.1 | 89.0 | — | 6.0 | — | 3.9 |
| 10 | 1.8 | 64.0 | — | 10.8 | — | 23.4 |

Non-corrosive gases may be purified using a getter alone where the gas to be purified does not contain high levels of $H_2O$ or $CO_2$.

METHOD OF PURIFICATION

A preferred embodiment for purifying ammonia will now be described. In this example, the ammonia (non-corrosive) does not contain high levels of $H_2O$ and/or $CO_2$, therefore the gas is purified using a getter alone.

Referring to FIG. 1, a flow diagram of a dual bed specialty gas purifier in accordance with the present invention is shown. Liquid ammonia 10 is allowed to vaporize and then enters the purifier through $NH_3$ inlet valve 12. The ammonia then flows through valve 14 at approximately 20 standard liters per minute (SLM) into purifier bed A. Bed A contains a Zr-Fe-Sn getter alloy (weight percentages previously discussed) in particulate form with a particle size of approximately 125µ to 355µ (getter may also be used in pill form, typically with size 6 mm diameter × 4 mm height). The getter fills a stainless steel vessel with a 2.5 inch diameter and a 12.5 inch length and includes an internal support assembly suitable for the specific getter alloy.

The ammonia contacts the getter which is maintained at ambient temperatures (0° C. to 50° C.). Valves 18 and 22 to bed B are closed while bed A is used for purification. The getter removes $CO_2$, CO, oxygen, and water from initial levels of approximately 1 ppm to less than 10 ppb. Consequently, the ammonia is purified and exits through valve 16 to ammonia outlet 30 where it may be directed to a desired point of use.

Non-corrosive specialty gases containing high levels of carbon dioxide and/or water (greater than 1 ppm $CO_2$ and/or greater than 1 ppm $H_2O$) are contacted with an absorber which removes $CO_2$ and $H_2O$ to less than 10 ppb. A getter, placed after the absorber, then removes carbon monoxide, carbon dioxide, oxygen, and water to less than 10 ppb levels by adsorbing impurities onto the surface of the getter. For example, liquid nitrous oxide typically contains water and carbon dioxide at levels exceeding 1 ppm. An absorber can be paired with a getter to remove $H_2O$, $CO_2$, CO, and $O_2$ to less than 10 ppb, and to less than 1 ppb under appropriate flow rate conditions. In a preferred embodiment, the absorber (13X) and getter (Zr-Fe-Sn) were placed in a single stainless steel vessel separated by a stainless steel filter. The vessel contained approximately 50% absorber and 50% getter (volume %), however, these percentages can be varied depending on impurity levels of the gas to be purified. The nitrous oxide was initially contacted with the absorber for removal of excess $CO_2$ and $H_2O$ to less than 10 ppb. The getter then removed CO and $O_2$ to less than 10 ppb and further reduced the $CO_2$ and $H_2O$ levels. Both getter and absorber were maintained at ambient temperatures. The purified nitrous oxide was then directed to a desired point of use.

As previously discussed, corrosive specialty gases may be purified with any corrosive resistant absorber. For example, HCl may be purified using a molecular sieve or alumina absorber. Because HCl is highly corrosive and contains large amounts of water, activated alumina is the preferred purifier. In a preferred embodiment, a Hastelloy C-22 vessel with a 1.5 inch diameter and a 3.0 inch length was filled with activated alumina. The HCl was contacted with the absorber and water was removed from greater than 1 ppm to less than 1 ppb. The absorber was operated at ambient temperatures.

The preferred embodiments for the purification of ammonia, nitrous oxide, and HCl have been described using a single vessel to house the getter and/or absorber. Separate vessels for the getter and absorber may also be used for the present invention. The absorber/getter purifier would then include two vessels placed in series, with the absorber vessel preferably placed in front of the getter vessel.

Conventional stainless steel piping and plumbing fixtures may be used for purifying non-corrosive and corrosive specialty gases. However, it is preferable to use Hastelloy C-22 (high nickel concentration, produced by Hayes International) or 100% nickel piping and plumbing fixtures where corrosive gases are purified. Hastelloy C-22 is preferably used for HCl, HF, $NF_3$ and HBr, nickel is preferable for purifying $BF_3$, $SiF_4$, and $WF_6$, or nickel and Hastelloy C-22 may be used for $BCl_3$ and $Cl_2$. Use of these materials will prolong the life of the system by minimizing corrosion.

REGENERATION OF PURIFICATION BEDS

The purification systems described above are suitable for continuous operation with one purifier bed used for purification while another bed is regenerated. Referring again to FIG. 1, as trapped impurities accumulate in the absorber and/or getter material of bed A in purification vessel 11, the efficiency of purification bed A is reduced necessitating regeneration of the purification bed. In the case of the above described ammonia purification system (at a flow rate of 20 SLM), regeneration of the purification bed is necessary approximately every 96 hours. This time may vary with flow rate, initial purity of the gas being purified, etc. Once purity levels fall below a prescribed level, a new purification bed may be brought on-line while the initial bed is regenerated.

The second purification bed allows the flow of purified gas to continue with no interruption to the process, while the system is regenerating the first purification bed. The entire process may be completely automated with a programmable logic controller (PLC) or a similar control mechanism. Regeneration of a purification bed restores the bed to its original efficiency with only a slight effect on the lifetime capacity of the purifier bed. Eventually the getter beds will need to be replaced upon reaching their lifetime capacity which is a function of inlet impurity levels. Getter beds may last for a period up to ten years if the gas flow purified is paired with a vessel containing an appropriate amount of getter.

FIG. 1 shows bed B in purification vessel 13 in regeneration mode. Regeneration for purification bed A is identical with the exception of the valves activated. Regeneration of bed B begins immediately after the system is initialized. For ammonia, regeneration assures that a freshly regenerated bed will be available within 24 hours of start up of the system. In this example, subsequent regenerations of the purifier beds take place every 96 hours (i.e. when necessitated because of use of the bed in purification).

The first step of the initial regeneration is to equilibrate the purification beds with ammonia (or the particular specialty gas to be purified) from the unpurified source. From the above described method, ammonia is already flowing through bed A (valves 14 and 16 are open). Valves 18 and 20 are opened to allow the flow of ammonia through bed B. Ammonia is continuously flowed through both beds for 15 minutes. This allows for pressure and flow equalization in both beds.

The second step is a nitrogen purge of bed B. Valves 18 and 20 are closed to isolate bed B from the process. Ammonia is continuously purified in bed A during the regeneration of bed B. Nitrogen is introduced to the system through regeneration inlet 40. Valves 24 and 28 are opened allowing nitrogen to flow through and purge bed B exiting through metering valve/regeneration outlet 70. The nitrogen purge (controlled by metering valve 42 and set at 1 SLM) removes all traces of ammonia from bed B. The purge continues for 30 minutes.

The third step of the initial regeneration is to heat bed B, containing a nitrided Zr-Fe-Sn getter alloy under a flow of nitrogen. Where nitrogen will be used to regenerate the system, it is preferable to nitride the getter alloy (whatever alloy is used) prior to purification. This avoids potentially dangerous exothermic nitriding in the purifier vessel which could occur during regeneration of the purifier beds with nitrogen. Nitriding preferably is done prior to placing the getter in the purifier vessel.

The valve positions remain the same as in step two, while heat is applied at 350° C. to bed B from heat generating source 60. Any heating means may be used. However, in the preferred embodiment, an external band heater 60 is used. At an external vessel skin temperature of 350° C., the approximate internal temperature of the vessel is a minimum 250° C. and preferably 300° C. to 325° C. The elevated temperature of this step provides sufficient energy to break the molecular bonds within each species of impurity. Carbon, oxygen, and nitrogen are then absorbed into the getter material. Hydrogen, which has been adsorbed by the getter at ambient temperatures, is released from the getter at these high temperatures and exits the system with the nitrogen. This step lasts 4 hours.

The fourth step is a nitrogen purge of bed B while the temperature of the bed is decreased to ambient temperatures. Nitrogen continues to flow through bed B while heat from heat generating source 60 is removed. The purge lasts 8 hours. Immediately before the end of the 8 hour purge, the PLC checks the temperature of the purification bed. If the temperature of the bed has decreased to below 150° C., valve 28 will close 30 seconds prior to valve 24. This allows a buildup of nitrogen in the vessel to line pressure, in preparation for the next step. At ambient temperatures the regeneration process takes 12 hours and 30 minutes to complete from equilibration to standby.

The fifth step in the initial regeneration is a standby step lasting for approximately 83 hours (assuming that beds A and B are alternated in 96 hour shifts). All valves to column B are closed from previous steps, and the vessel is isolated from all gas flow. Purifier bed B is now regenerated and is ready for operation when purifier bed A completes its 96 hour operation period.

The last step of the initial regeneration is a purge of bed B with the purified gas (ammonia) to remove all nitrogen from bed B and protect the purified ammonia. Valves 80 and 28 are opened to provide a back-flow of purified ammonia to bed B. The amount of purified ammonia is controlled by metering valve 70 at approximately 1 SLM. The ammonia purge lasts for 30 minutes. Valve 28 is closed 30 seconds before valve 80 to allow buildup of ammonia pressure in the vessel. This reduces the pressure and flow loss which occurs when the bed is opened and purification begins.

Bed A may now be regenerated while bed B purifies. The regeneration steps for bed A are identical, with the exception of the valves activated. For example, valves 22 and 26 are opened to allow nitrogen to flow through and purge bed A, with nitrogen then exiting through metering valve/regeneration output 70, heat generating source 61 is used on bed A, etc.

This regeneration method and apparatus can be utilized on corrosive as well as non-corrosive specialty gases, and may be used where the purifier beds contain an absorber, a getter, or an absorber and a getter. Argon may also be used as a regeneration gas. Use of argon will increase the amount of time between required regenerations because when argon is used it is not necessary to use nitrided getter alloy. The non-nitrided getter removes more impurities than a nitrided getter. However, because argon is generally more expensive than nitrogen, nitrogen is the preferred regeneration gas. Similarly, noble gases other than argon could be used, but are not preferred because of their higher cost.

The purification and regeneration methods have been described in situ. It is inherent that the system could be designed for removal of the purification beds for regeneration. However, removal of the beds would increase the potential for contamination of the system. Therefore, the regeneration is preferably conducted in situ.

The above described purification and regeneration methods and apparatus may also be used to purify inert gases such as nitrogen, helium, and argon. Where inert gases are purified, the above described absorber and/or getter combinations may also be used.

It is inherent that the purification and regeneration methods and apparatus described may be used to purify non-bulk source specialty gases (standard size gas cylinders) and therefore may also be used for continuous flow purification at the point of use.

Although the present invention has been described above in terms of a specific embodiment, it is anticipated that alterations and modifications will become apparent to those skilled in the art. It is therefore intended that the following claims be interpreted as covering all alterations and modifications that fall within the true spirit and scope of the invention.

What is claimed is:

1. A method for continuous removal of impurities from a flow of a specialty gas selected from the group consisting of $AsH_3$, $B_2H_6$, $CF_4$, $C_2F_6$, $CCl_4$, $CH_4$, $SiH_2Cl_2$, $GeH_4$, $Ge_2H_6$, $H_2Se$, $NH_3$, $N_2O$, $PH_3$, $SF_6$, $SiH_4$, $Si_2H_6$, $CO$, $CO_2$, $CH_2F_2$, $CHF_3$, $CH_3F$, and other freons using at least two alternating purifier beds comprising the steps of:

(a) contacting the specialty gas at a temperature between 0° C. and 50° C. with a first getter purifier material in a first vessel to produce a purified specialty gas, where the first getter purifier material comprises at least a material selected from the group consisting of zirconium, titanium, alloys including zirconium, and alloys including titanium; and (b) at the same time regenerating a second getter purifier in a second vessel, where the second getter purifier material comprises at least a material selected from the group consisting of zirconium, titanium, alloys including zirconium, and alloys including titanium, and wherein the regeneration comprises the steps of:

(i) purging the second getter purifier material with a flow of an inert gas selected from the group consisting of nitrogen and noble gases;

(ii) heating the second getter purifier material to a temperature greater than 250° C. while continuing the flow of the inert gas;

(iii) returning the second getter purifier material to a temperature between 0° C. and 50° C.; and (iv) purging the second getter purifier material with a flow of the purified specialty gas.

2. The method of claim 1, further comprising the step of contacting the specialty gas, prior to contact with the first getter material, with a first adsorber material at a temperature between 0° C. and 50° C., where the first adsorber material comprises at least a material selected from the group consisting of molecular sieve, silica gel, and alumina.

3. The method of claim 2, wherein a second adsorber material selected from the group consisting of molecular sieve, silica gel, and alumina, is situated upstream from the second getter purifier material with regard to the flow direction when the second getter purifier material is used for purification of a specialty gas, and wherein during the regeneration step the second adsorber material is regenerated with the flow of gas passing out of the second getter purifier material.

4. The method of claim 3, wherein the getter purifier material is nitrided prior to use of the getter purifier material for removal of impurities.

5. The method of claim 2, wherein the getter purifier material is nitrided prior to use of the getter purifier material for removal of impurities.

6. The method of claim 1, wherein the getter purifier material is nitrided prior to use of the getter purifier material for removal of impurities.

7. A method for removal of impurities from a flow of a specialty gas selected from the group consisting of $AsH_3$, $B_2H_6$, $CF_4$, $C_2F_6$, $CCl_4$, $CH_4$, $SiH_2Cl_2$, $GeH_4$, $Ge_2H_6$, $H_2Se$, $NH_3$, $N_2O$, $PH_3$, $SF_6$, $SiH_4$, $Si_2H_6$, $CO$, $CO_2$, $CH_2F_2$, $CHF_3$, $CH_3F$, and other freons using comprising the steps of:

(a) contacting the specialty gas with an adsorber material at a temperature between 0° C. and 50° C., where the adsorber material comprises at least a material selected from the group consisting of molecular sieve, silica gel, and alumina; and (b) subsequently contacting the specialty gas with a getter purifier material at a temperature between 0° C. and 50° C., where the getter purifier material comprises at least a material selected from the group consisting of zirconium, titanium, alloys including zirconium, and alloys including titanium.

8. The method of claim 7, wherein the getter purifier material is nitrided prior to use of the getter purifier material for removal of impurities.

* * * * *